July 7, 1931.  G. P. KANNEN  1,813,055
DIVIDING STONE FOR GARDENS OR LAWNS
Filed Feb. 23, 1928  2 Sheets-Sheet 1

Witness:
Chas. P. Koursh

Inventor,
George P. Kannen,
George Bizard Jones, Atty.

July 7, 1931.   G. P. KANNEN   1,813,055
DIVIDING STONE FOR GARDENS OR LAWNS
Filed Feb. 23, 1928   2 Sheets-Sheet 2
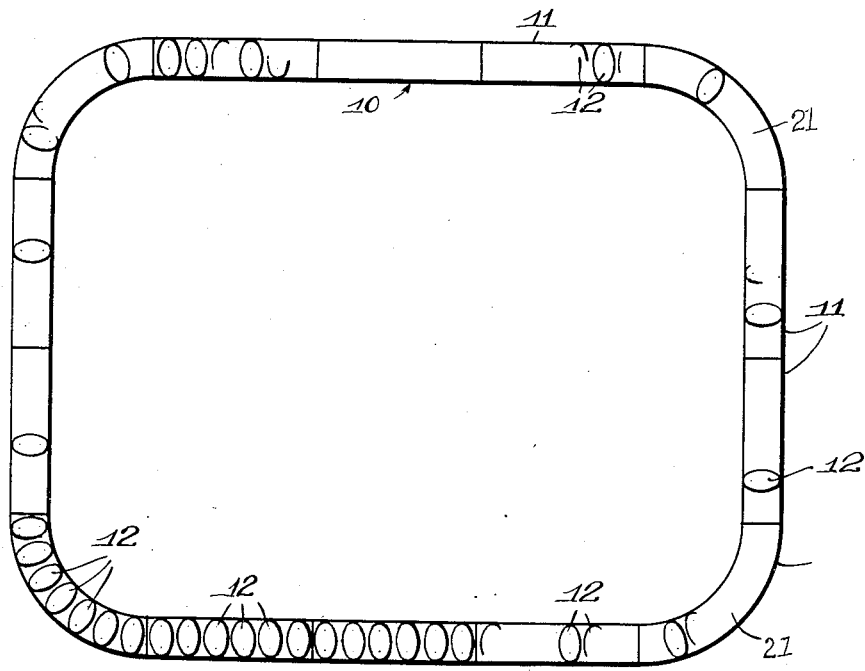
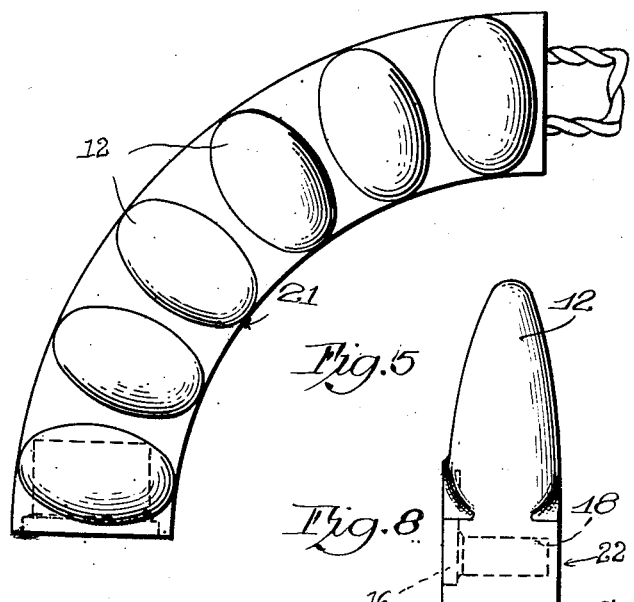
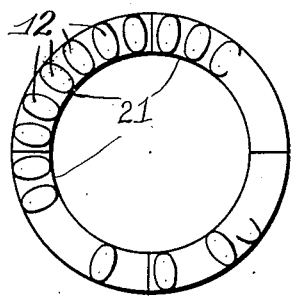
Inventor,
George P. Kannen, Patented July 7, 1931

1,813,055

UNITED STATES PATENT OFFICE

GEORGE P. KANNEN, OF BERWYN, ILLINOIS

DIVIDING STONE FOR GARDENS OR LAWNS

Application filed February 23, 1928. Serial No. 256,158.

This invention relates to improvements in dividing stones for gardens or lawns.

The principal object of the invention is to provide an artificial stone adapted to be given a variety of shapes or contours, in simulation, if desired, of natural stones, such as cobble stones or the like, which artificial stones are provided with means for uniting them one to the other in building borders or curbs for drives, flower gardens, or dividing or defining any particular area or areas of a garden or lawn in an ornamental manner.

A further object of the invention relates to the means for forming a concealed bond between the individual stones, said means being simple of construction and being adapted to effect the alignment or registration of the stones and to hold the same in their proper vertical planes.

Other objects of the invention relate to further features of the connecting means and construction of the stone which will be apparent from the consideration of the following specification and accompanying drawings, wherein:

Fig. 5 is a top plan view of a corner stone,

Figs. 6 and 7 are plan views showing how the stones may be combined to form two border shapes, many other shapes being possible, and Fig. 8 is an elevation of a finishing unit.

Figure 1:
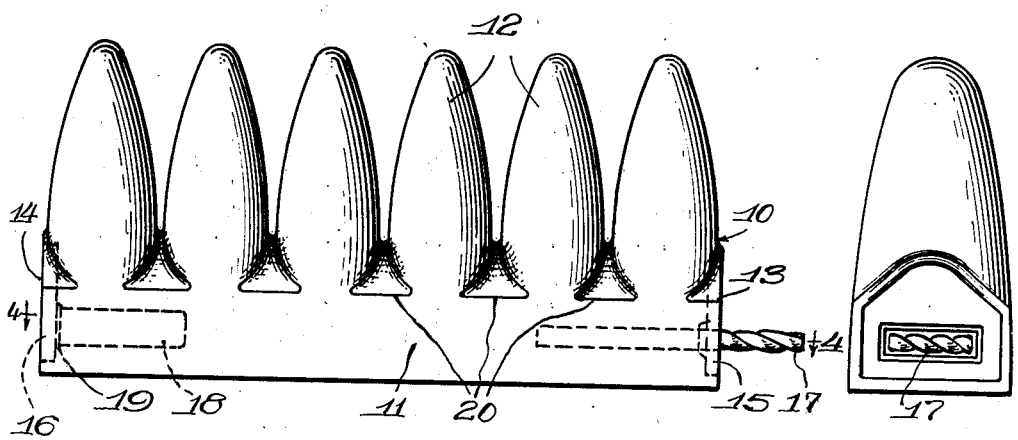
Fig. 1 is a side elevation of a stone embodying the present improvements.
Figure 2:
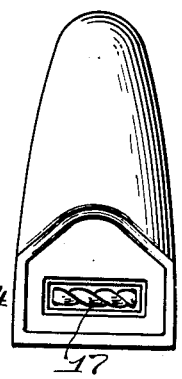
Fig. 2 is a view of the right hand end of the stone shown in Fig. 1.

In the drawings 10 is a stone having a body or base 11 and a plurality of projections 12 which are shown as of uniform shape but which may be of non-uniform contours to simulate natural stone. The ends 13, 14 of the base portion preferably are disposed in vertical planes and are provided with molded recesses 15 and 16 respectively.

The stones are molded in suitable form of concrete and may be colored as desired as will be obvious, the color being disposed throughout the mass in order that should small portions be clipped off by garden or lawn implements, the stones will not become unsightly. They may be formed of suitable material other than concrete as will be obvious.

The proportions of cement, sand and stone making up the concrete may be such as is suitable for the purpose, but a small quantity of calcium chloride, about 10% or less by weight, in the mixing water is used preferably to hasten the hardening of the concrete and to strengthen the same.

Figure 3:
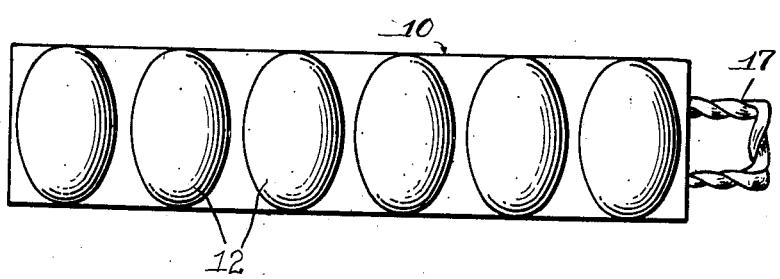
Fig. 3 is a top plan view thereof.
Figure 4:
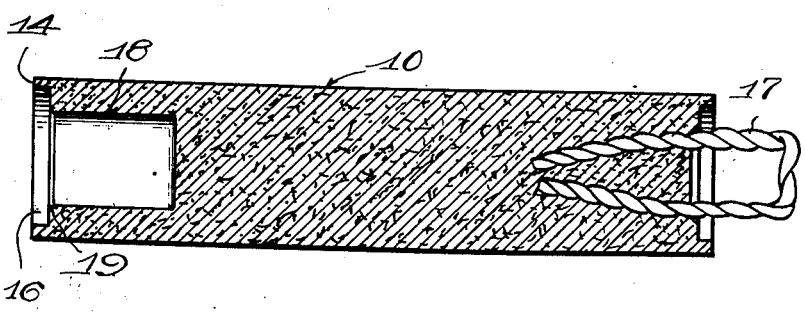
Fig. 4 is a sectional view taken on the line 4—4 of Fig. 1.

In the manufacture of the stones a U shaped bar 17 is inserted in the mold, a portion of which bar extends through the recess 13 a suitable distance beyond the end of the stone, as shown in Figs. 1 and 3. The inner ends of the bar are angularly disposed to firmly anchor the bar in the stone.

The bar is preferably twisted as shown to provide suitable anchorage in the concrete and where the calcium chloride is used in the mixture, the bar should be coated, as with lead, to protect the iron from the action of the chloride. The loop of the bar also provides a handle for convenience in carrying the stone and which may be bent when desired to provide a slight angularity between adjacent stones to permit a border formed of the stones to follow the general contour of the ground surface.

The opposite end of the stone is provided with a molded socket 18 which extends inwardly from the recess 14, the mouth of the socket being tapered slightly as shown at 19. The socket is wide enough to receive the loop 17 of the bar of an adjacent similar stone, the loop and walls of the socket thus serving to aline the stones when they are placed end to end in forming a border for defining a flower bed or the like.

In practice, the recesses 13, 14 are filled with a rich cement mixture or other adhesive prior to the final placing of the stones which, when set, forms a concealed bond between the stones and prevents the entrance of water into the sockets as will be seen. In use the stones are embedded in the ground approximately to the horizontal lines 20 defined by the merging of the curved sides of the projections 12 with the vertical side walls of the base 11. The surfaces between adjacent projections incline downwardly from the center line of the stone and prevent the accumulation of soil between the projections in which grass or weeds might grow.

In Fig. 5 I have shown a stone 21 which is curved and which may be used as a corner stone when desired, although it will be understood that stones may be provided having still different curves or may be formed with angles of various degrees when desired within the scope of the present improvements.

Fig. 6 illustrates how a circular border may be formed by using a number of the curved stones 21, while Fig. 7 illustrates a generally rectangular shaped border having its corners formed by curved stones 21.

In Fig. 8 is illustrated a smaller stone unit 22, shown as comprising a single projection 12. This stone has a socket 18 and recess 16 similar to the stones previously described but has no aligning bar as in the other modifications. This smaller stone unit which may of course have more than one projection 12 is used for finishing a border where the same abuts against some other structure such as against a house, a curb, sidewalk or the like.

Although I have shown certain features of my improvements for the purpose of illustration, it will be apparent that various changes may be made without departing from the spirit of the invention as defined in the appended claims.

What I claim is:

1. A molded dividing stone having a base provided with an integral upwardly extending ornamental portion, the ends of said base being disposed in vertical planes, each end being provided with a recess spaced from the edges thereof, a bendable metal alining member embedded in the base and projecting through one of said recesses beyond the corresponding end of the base, the opposite end of the base having a longitudinal molded socket extending inwardly from said recess and adapted to receive a similar alining member of another stone said socket having walls cooperating with said aligning member to align said stones, said recesses being adapted to receive plastic adhesive material for uniting contiguous stones and sealing said sockets against moisture when a plurality of said stones are arranged in end to end relation.

2. An artificial dividing stone having a base, a metal alining member embedded in said base and having a vertically bendable portion projecting from one end of the stone, the opposite end of said base being provided with a socket adapted to receive a similar alining member of another stone for alining the same, the ends of said base being provided also with recesses spaced from the respective edges thereof and adapted to be filled with plastic adhesive whereby when two of said stones are placed in end to end relation with the alining member of one extending into the socket of the other, the plastic adhesive will seal said socket against moisture and will harden to form a block uniting said stones and adhering to the alining member to prevent the relative displacement of the stones.

3. An artificial dividing stone having a base, a bendable metal alining member embedded therein and projecting from the end thereof in the form of a substantially horizontal loop providing a handle for convenience in carrying the stone, the opposite end of said base having a molded socket adapted to receive a similar loop of the alining member of another stone, the walls of the socket being adapted to cooperate with said loop to aline the stones horizontally and laterally when placed end to end, the contiguous ends of said stones being provided with registering recesses spaced from the respective edges of said ends for receiving plastic cement for sealing said socket against moisture and forming a concealed bond between the stones.

4. A molded stone comprising a base portion provided with plane side walls and upstanding spaced ornamental portions, the surfaces between said portions being inclined downwardly from the longitudinal center line of the stone to said plane side walls to form a depth line and serving to prevent the accumulation of soil between said ornamental portions.

In testimony whereof, I have subscribed my name.

GEORGE P. KANNEN.